(12) United States Patent
Osada

(10) Patent No.: US 6,868,321 B2
(45) Date of Patent: Mar. 15, 2005

(54) DISPLAY CONTROL APPARATUS FOR VEHICLE AND THE METHOD THEREOF

(75) Inventor: Yuhki Osada, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 87 days.

(21) Appl. No.: 10/348,823

(22) Filed: Jan. 22, 2003

(65) Prior Publication Data

US 2003/0139862 A1 Jul. 24, 2003

(30) Foreign Application Priority Data

Jan. 22, 2002 (JP) ................................. P. 2002-012274

(51) Int. Cl.[7] .......................... G06F 17/00; B60Q 3/02
(52) U.S. Cl. .......................... 701/36; 701/1; 340/461
(58) Field of Search .................... 701/36, 1; 345/7; 340/461, 815.75

(56) References Cited

U.S. PATENT DOCUMENTS

| | | | | |
|---|---|---|---|---|
| 5,202,668 A | * | 4/1993 | Nagami | 345/7 |
| 5,583,484 A | * | 12/1996 | Asano | 340/461 |
| 5,796,350 A | * | 8/1998 | Fuse | 340/815.75 |
| 6,005,348 A | * | 12/1999 | Kambara et al. | 315/82 |
| 6,556,134 B2 | * | 4/2003 | Nakaji et al. | 340/461 |
| 6,720,938 B2 | * | 4/2004 | Ohkawara et al. | 345/7 |

FOREIGN PATENT DOCUMENTS

JP 200212058 * 1/2002

* cited by examiner

Primary Examiner—Tan Q. Nguyen
(74) Attorney, Agent, or Firm—Smith, Gambrell & Russell, LLP

(57) ABSTRACT

A display control apparatus of a vehicle has, a vehicle key switch for switching on or off electrical energy to the vehicle and for turning off headlights, a delay timer, for maintaining display operation of a display member for a predetermined time period after the vehicle key switch is turned off, a headlight switch for turning on or off the headlights when the key switch is turned on, a switch detecting unit for detecting operation state of the key switch and the headlight switch and, a display drive control unit for controlling the display operation of the display member within a delay time set by using nighttime reduced brightness when the switch detecting unit detects an off operation of the vehicle key switch and an operation of the headlight switch so as to prevent unnecessary consumption of the battery capacity.

9 Claims, 2 Drawing Sheets

DISPLAY CONTROL APPARATUS FOR VEHICLE AND THE METHOD THEREOF

BACKGROUND OF THE INVENTION

1. Field of the Invention

The present invention relates to a display control apparatus for a vehicle which is used to control a display operation of a display member after a vehicle key switch is switched off, particularly to the display control apparatus for maintaining a nightly diminished brightness for a predetermined time period even if it is switched to a daylight brightness condition.

2. Description of the Related Art

Recently, in an interior of a vehicle, to display meters and various kinds of information, there is often used a display member such as a liquid crystal panel, or a liquid crystal display panel or a fluorescent display panel using a backlight. This display member is generally linked with a vehicle key switch and is set in the following manner: that is, when the vehicle key switch is switched on (ON), the display member can be operated for display and, when the vehicle key switch is switched off (OFF), it stops its operation for display (display operation).

But, in case where, when the vehicle key switch is switched off, the display operation of the display member is stopped immediately, there arises an inconvenience that, after the vehicle key switch is switched off, display contents cannot clearly be seen. In order to avoid this, there is proposed a display control apparatus which, using a delay timer, can maintain the display operation for a predetermined time period after the vehicle key switch is switched off.

However, in the case where a set time of the delay timer is set long, not only a battery is forced to bear an unnecessary load but also, when a driver leaves the vehicle, the display member still continues to display the display contents, thereby causing the driver to have a fear that the battery is exhausted; and, therefore, the driver must stay in the vehicle until he or she makes certain that the display operation is completely stopped. In order to avoid this, the inventors of the present patent application have developed the display control apparatus for the vehicle which, after the vehicle key switch is switched off, can continue its necessary minimum display operation and also can provide good visual confirmation without exhausting unnecessarily, and have previously filed a similar patent application for the present display control apparatus for the vehicle (Patent Application No. 2000-197834).

By the way, there exists the vehicle of the type that, headlights can be turned off even when a headlight switch is switched on after a vehicle key switch is switched off in order to prevent the driver from forgetting to turn off the headlights. Also, in the vehicle of this type, there is included the vehicle which can use two kinds of illumination brightness respectively for daytime and nighttime in order to enhance a visibility of the display contents of the above-mentioned display member such as the liquid crystal panel. That is, for this kind of vehicle, when the headlights are on, the time is judged as a nighttime and thus, as the illumination brightness of the display member, there is used nighttime reduced brightness. When the headlights are off, the time is judged as a daytime and thus, as the illumination brightness of the display member, there is used a daytime brightness.

Therefore, in the above-mentioned vehicle, in case where the headlights are turned off by switching off the vehicle key switch, even when the headlight switch is switched on, the time is judged to be the daytime and thus, as the illumination brightness of the display member, there is used the daytime brightness. As a result of this, the illumination brightness of the display member within a delay time set by a delay timer is switched from the nighttime reduced brightness to the daytime brightness, thereby dazzling the driver. Also, since the daytime brightness is used as the illumination brightness during the nighttime, the battery is consumed unnecessarily.

SUMMARY OF THE INVENTION

It is an object of the present invention to provide a display control apparatus for a vehicle which, even when headlights are turned off by switching off a vehicle key switch during a daytime, can maintain a nighttime reduced brightness as an illumination brightness of a display member.

In attaining the above object, according to a first aspect of the present invention, there is a display control apparatus for a vehicle having a key switch for switching on and off an application of an electrical energy to the vehicle and for turning off headlights by cutting off the electrical energy applied to the vehicle, having: a delay timer for maintaining a display operation of a display member for a predetermined period of time after the vehicle key switch is switched off; a headlight switch for turning on or off the headlights when the vehicle key switch is switched on; a switch detecting unit for detecting operation states of the vehicle key switch and the headlight switch; and a display drive control unit for controlling the display operation of the display member within a delay time set by the delay timer to be executed using nighttime reduced brightness when the switch detecting unit detects off operation of the vehicle key switch in the case of the headlight switch being detected.

Also, according to a second aspect of the invention, there is provided the display control apparatus for the vehicle as set forth in the first aspect of the present invention, wherein the nighttime reduced brightness has a reduced daylight brightness by half.

According to a third aspect of the invention, there is provided the display control apparatus for the vehicle as set forth in the first aspect of the present invention, further having: a door switch of a seat of a driver for reducing the delay time when the door switch is operated with opening and closing operations of a door.

According to a fourth aspect of the invention, there is provided the display control apparatus for the vehicle as set forth in the first aspect of the present invention, further having: a delay time setting switch for reducing and extending the delay time.

According to a fifth aspect of the invention, there is provided the display control apparatus for the vehicle as set forth in the fourth aspect of the present invention, wherein the delay time setting switch is actuated in connection with a trip knob switch which is used to reset a trip meter or an odometer.

According to a sixth aspect of the invention, there is provided a display control method for a vehicle having steps of: detecting whether the a vehicle key switch is switched off when a vehicle key switch and a headlight switch are turned off headlights; allowing a display member to perform a display operation thereof when the headlight switch is rotated to the position to turn on the headlights and when a time is judged to be a nighttime; and, carrying on a nighttime reduced brightness within a delay time.

According to a seventh aspect of the invention, there is provided the display control method for the vehicle as set forth in the sixth aspect of the present invention, further having the steps of: allowing the display member to perform the display operation thereof when the headlight switch is turned off and the time is judged to be a daytime; and, carrying on a day time brightness within the delay time.

According to a eighth aspect of the invention, there is provided the display control method for the vehicle as set forth in the sixth aspect of the present invention, further having the steps of: detecting whether a delay time setting switch is switched on; counting time during the delay time setting switch is being depressed when the switch-on of the delay time setting switch is detected; detecting whether the delay time setting switch is switched off; detecting whether the counted time is equal to or more than 0.5 sec. when a switch-off of the delay time setting switch is detected; stopping the display operation of the display member in case where the counted time is equal to or more than 0.5 sec. when the counted time is within the delay time; and turning off the display operation of the display member in case where the counted time is less than 0.5 sec. after the delay time is lapsed.

According to a ninth aspect of the invention, there is provided the display control method for the vehicle as set forth in the sixth aspect of the present invention, further having the steps of: detecting whether a delay time setting switch is switched on within the delay time; detecting an operation state of a door switch when the switch-on of the delay time setting switch is undetected; stopping the display operation of the display member when an on to off operation of the door switch is detected within the delay time, on the other hand, and turning off the display operation of the display member when the on to off operation of the door switch is undetected after the delay time is lapsed.

According to the display control apparatus or method for a vehicle as set forth in the first to ninth aspects of the invention, the display operation of the display member within a delay time set by the delay timer is executed by using the nighttime reduced brightness when the off operation of the vehicle key switch is detected in case where it is detected that the headlight switch is switched on. That is, even in the case where the headlights are turned off by switching off the vehicle key switch, the operation state of the headlight switch is checked to judge whether the time is nighttime or daytime, and, the illumination brightness is selected based on the judgement. Therefore, during the nighttime, even when the vehicle key switch is switched off and the headlights are thereby turned off, the illumination brightness can be prevented from being switched over to the daytime brightness, which can eliminate the possibility that the driver can be dazzled by the headlights. Also, since, during the nighttime, it is possible to prevent the daytime brightness from being used as the illumination brightness of the display member, not only unnecessary consumption of the battery can be prevented but also an application of an unnecessary load to the illumination source can be reduced to thereby extend the life of the illumination source.

DETAILED DESCRIPTION OF THE PREFERRED EMBODIMENTS

Figure 1:
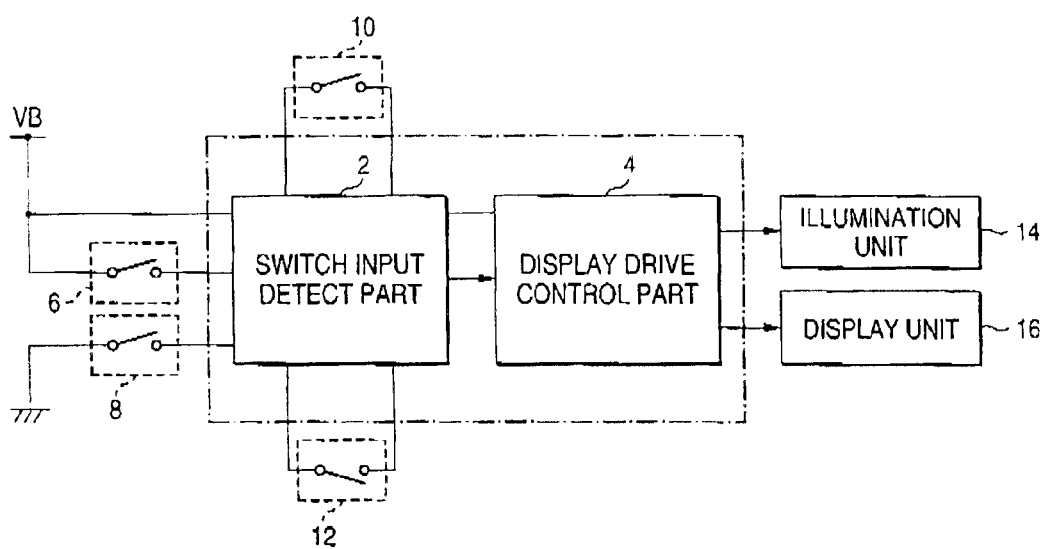
FIG. 1 is a block diagram of an embodiment of a display control apparatus for a vehicle according to the present invention; and, FIG. 2 is a flow chart in accordance with which the display control apparatus for the vehicle controls the display operation of a display member.

Now, description will be given below of an embodiment of a display control apparatus for a vehicle according to the present invention with reference to the accompanying drawings. FIG. 1 is a block diagram of the display control apparatus for the vehicle according to the present embodiment of the invention. This display control apparatus for the vehicle comprises a switch input detecting element 2 for detecting an operation state of a switch necessary to control the display operation of a display member, and a display drive control unit 4 for controlling to drive the display member.

To the switch input detecting element 2, there are connected a vehicle key switch (IG switch) 6, to which a battery voltage VB is connected and also which is used to turn on (ON) or off (OFF) an application of an electrical energy from the battery voltage VB to the vehicle, a driver's seat door switch 8 which can be operated in linking with the opening and closing operations of a driver's seat door, and a headlight switch 12 which is used to turn on or turn off headlights when a delay time setting switch 10 for reducing or extending a delay time and the IG switch 6 are both on. By the way, the driver's seat door switch 8 is switched on when the driver's seat door is opened, whereas it is switched off when the driver's seat door is closed.

Also, the delay time setting switch 10 can also be structured to be functioned by a trip knob switch which is used to reset a trip meter or an odometer. That is, by pressing down the trip knob switch, the delay time setting switch 10 can be switched on.

Further, the display drive control unit 4 is connected to the switch input detecting element 2; and, to the display drive control unit 4, there are connected an illumination unit 14 for illuminating meters respectively disposed on an instrument panel, and a display unit for displaying a temperature of an interior of a vehicle room and time.

Figure 2:
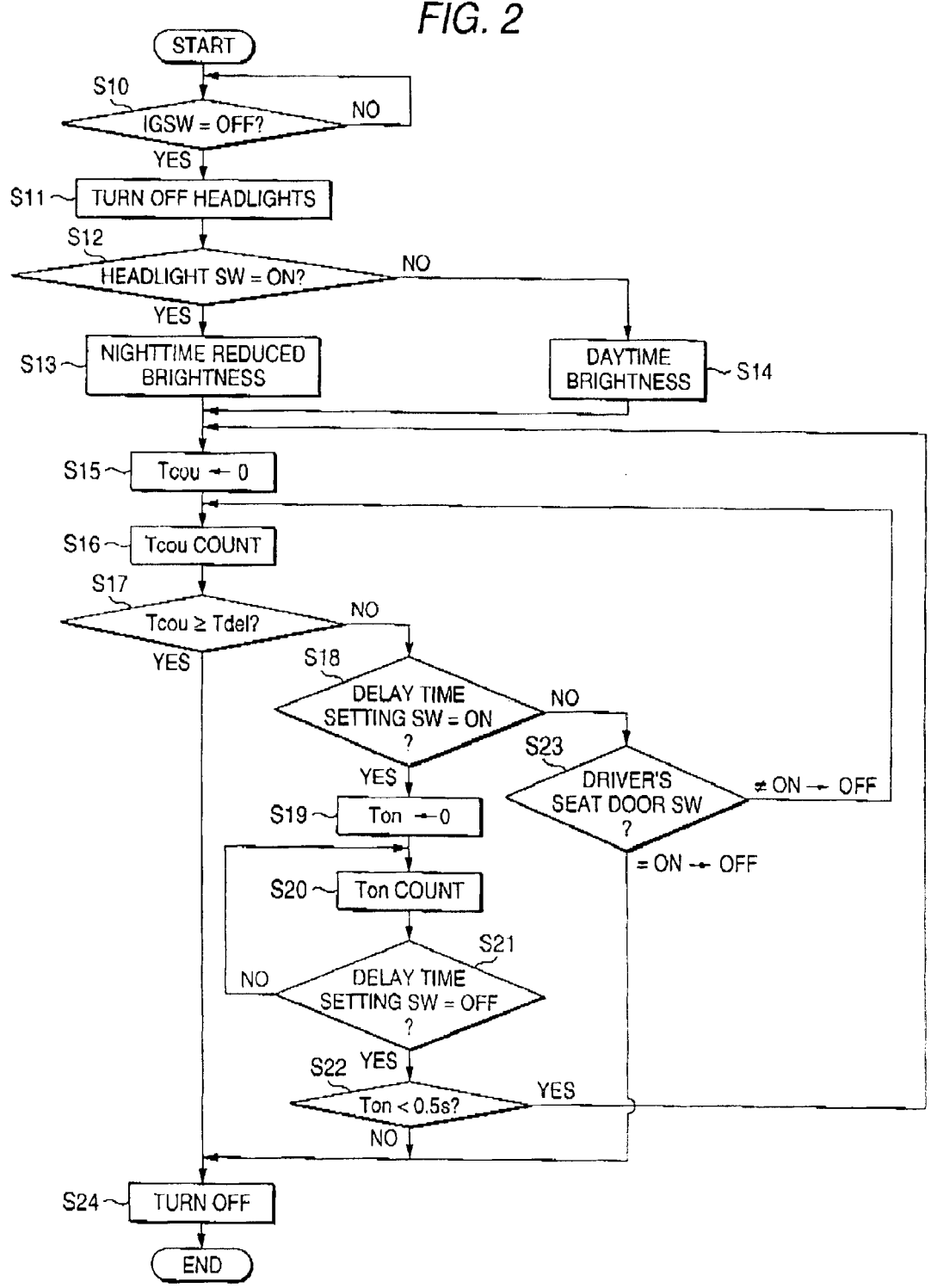

Next, the description will be given below of a control of the display operation of the display member to be executed by the display control apparatus for the vehicle with reference to a flow chart shown in FIG. 2.

First, the switch input detecting element 2 detects whether the IG switch 6 is switched off or not (Step S10). In case where the switch-off of the IG switch 6 is not detected, the detecting operation of the switch input detecting element 2 is kept on until the switch-off of the IG switch 6 is detected.

On the other hand, in case where the switch-off of the IG switch 6 is detected (Step S10), when the headlights are ON, the headlights are turned off (Step S11). That is, in case wher the IG switch 6 is switched off, even when the headlight switch 12 is ON, the headlights are turned off.

Next, the detecting element 2 detects whether the headlight switch 12 is ON or not, that is, whether the headlight switch 12 is rotated to a position to turn on the headlights or not (Step S12). In case where the headlight switch 12 is ON, even when the headlights are OFF, the time is judged to be nightime and thus a display member, which is composed of the illumination unit 14 and adisplay unit 16, is allowed to perform its display operation,using the night time reduced brightness (Step S13). On the other hand, in case wher the detecting member 2 detects the headlight switch 12 is OFF, that is, that the headlight switch 12 is rotated to the position to turn off the headlights (Step S12), the time is judged to be a daytime and thus the display member composed of the illumination unit 14 and the display unit 16 is allowed to perform the display operation, using the daytime brightness (Step S14).

Next, the count time Tcou of a delay timer (not shown) disposed in the display drive control unit 4 is set to 0 (Step S15) and the count of the count time Tcou is started (Step S16). And, it is checked whether the count time Tcou reaches a previously set delay time Tdel or not (Step S17).

In case where the count time Tcou reaches the delay time Tdel, that is, Tcou≧Tdel (Step S17), an application of the electrical energy to the illumination unit 14 and display unit 16 is cut off to thereby cause the display operation of the display member to stop and thus turn off thereof (Step S24).

On the other hand, in case where the count time Tcou does not reach the delay time Tdel, that is, Tcou<Tdel (Step S17), the detecting member 2 detects whether the delay time setting switch 10 is ON or not (Step S18).

When it is detected that the delay time setting switch 10 is ON (Step S18), an ON time Ton, which is a count value of an ON time counter (not shown), is set to 0 (Stet S19). And, the ON time Ton until the delay time setting switch 10 is switched off, that is, the time during the delay time setting switch 10 is being depressed is counted (Step S20).

Next, it is checked whether the delay time setting switch 10 is switched off or not (Step S21). In case where it is not detected that the delay time setting switch 10 is switched off, the processing returns to the Step S20 to continue the count of the ON time Ton.

On the other hand, in case where it is detected that the delay time setting switch 10 is switched off, it is checked whether the ON time Ton is equal to or more than 0.5 sec. or not (Step S22). And, in case where it is detected that the ON time Ton is equal to or more than 0.5 sec., that is, the delay time setting switch 10 has been continuously depressed long (Step S22), even when the count time Tcou does not reach the delay time Tdel, the application of the electrical energy to the illumination unit 14 and display unit 16 is cut off to thereby cause the display operation, of the display member to stop and thus turn off it (Step S24).

On the other hand, in case where it is detected that the ON time Ton is less than 0.5 sec., that is, the delay time setting switch 10 is instantaneously depressed for a short period time (Step S22), the processing returns to the Step S15, where the value of the count time Tcou is reset to 0, the count time Tcou is then counted (step S16), and the count time Tcou and the delay time Tdel are compared with each other (Step S17). And, in case where it is judged that the count time Tcou reaches the delay time Tdel, the application of the electrical energy to the illumination unit 14 and display unit 16 is cut off to thereby cause the display operation of the display member to stop and thus turn off it (Step S24).

In the above-mentioned step S18, in case where it is not detected that the delay time setting switch 10 is ON, the driver's seat door switch 8 is checked for the operation state thereof (Step S23). And, when it is detected that the driver's seat door switch 8 is switched from ON to OFF, that is, when the driver gets out of the vehicle, even within the delay time set by the delay timer (not shown), the application of the electrical energy to the illumination unit 14 and display unit 16 is cut off to thereby cause the display operation of the display member to stop and thus turn off it (Step S24).

On the other hand, in case where it is not detected that the driver's seat door switch 8 is switched from ON to OFF (step S23), the process returns to the Step S16, where the count of the count time Tcou is continued, and the count time Tcou and delay time Tdel are compared with each other (Step S17). And, in case where it is judged that the count time Tcou reaches the delay time Tdel, the application of the electrical energy to the illumination unit 14 and display unit 16 is cut off to thereby cause the display operation of the display member to stop and thus turn off it (Step S24).

According to the display control apparatus for the vehicle of the present embodiment of the invention, in case where the switch input detecting member 2 detects that the IG switch 6 is switched off, the operation state of the headlight switch 12 is checked. When it is found that the headlight switch 12 is ON, the display operation of the display member within the delay time set by the delay timer is executed using the nighttime reduced brightness; and, when it is found that the headlight switch 12 is OFF, the display operation of the display member within the delay time set by the delay timer is executed using the daytime brightness. Therefore, even in case the IG switch 6 is switched off and the headlights are thereby turned off during the nighttime, the operation state of the headlight switch 12 is detected and, when the headlight switch 12 is ON, while maintaining the nighttime reduced brightness, the display operation of the display member within the delay time is carried out, thereby being able to prevent the driver from being dazzled by the headlights.

Also, during the nighttime, since an execution of the display operation of the display member within the delay time set by the delay timer using the daytime brightness can be prevented, it is possible not only to prevent the battery against unnecessary consumption but also to prevent unnecessary application of the electrical energy to the illumination source, thereby being able to extend the life of the illumination source.

Further, even within the previously set delay time, in case where the driver's seat door switch 8 is switched from ON to OFF, that is, in case where the driver gets out of the vehicle, and, in case where the delay time setting switch 10 is continuously depressed for a long time period, that is, for 0.5 sec. or longer, the application of the electrical energy to the illumination unit 14 and display unit 16 is cut off to thereby cause the display operation of the display member to stop and thus turn off thereof. Therefore, in case where it is not necessary to perform the display operation of the display member, the display member is turned off immediately, which not only can prevent the unnecessary consumption of the battery but also can extend the life of the illumination source.

According to the invention, while using the nighttime reduced brightness as the illumination brightness of the display member, even when the vehicle key switch 16 is switched off and the headlights are turned off, the illumination brightness can be prevented from being switched to the daytime brightness, which can prevent the driver from being dazzled by the headlights. Also, since, during the nighttime, it is possible to prevent the daytime brightness from being used as the illumination brightness, not only the unnecessary consumption of the battery can be prevented but also the unnecessary load to be borne by the illumination source can be reduced to thereby extend the life of the illumination source.

The disclosure of Japanese Patent Application No. 2002-012274 filed on Jan. 22, 2002 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A display control apparatus for a vehicle having a vehicle key switch for switching on and off electrical energy to the vehicle, and for turning off headlights by cutting off the electrical energy applied to the vehicle, comprising:

a delay timer for maintaining a display operation of a display member for a predetermined period of time after the vehicle key switch is switched off;

a headlight switch for turning on and off the headlights when the vehicle key switch is switched on;

a switch detecting unit for detecting an operation state of the vehicle key switch and the headlight switch; and, a display drive control unit for controlling the display operation of the display member within a delay time set by the delay timer to be executed using nighttime reduced brightness, when the switch detecting unit detects an off-operation of the vehicle key switch and an on-operation of the headlight switch.

2. The display control apparatus for the vehicle as set forth in claim 1, wherein the nighttime reduced brightness has a reduced daylight brightness by half.

3. The display control apparatus for the vehicle as set forth in claim 1, further comprising: a door switch of the driver's door for reducing the delay time when the door switch is operated with opening and closing operations of a door.

4. The display control apparatus for the vehicle as set forth in claim 1, further comprising: a delay time setting switch for reducing and extending the delay time.

5. The display control apparatus for the vehicle as set forth in claim 4, wherein the delay time setting switch is actuated in connection with a trip knob switch which is used to reset a trip meter or an odometer.

6. A display control method for a vehicle comprising steps of:

detecting whether the a vehicle key switch is switched off and a headlight switch is turned on;

allowing a display member to perform a display operation in a nighttime reduced brightness for a predetermined period of time after the vehicle key switch is switched off when the headlight switch is turned on.

7. The display control method for the vehicle as set forth in claim 6, further comprising the steps of:

allowing the display member to perform the display operation in a daytime brightness for a predetermined period of time after the vehicle key switch is switched off when the headlight switch is turned off.

8. The display control method for a vehicle as set forth in claim 6, further comprising the steps of:

detecting whether a delay time setting switch is switched on;

counting time during the time the delay time setting switch is switched on when the switch-on of the delay time setting switch is detected to obtain a value for counted time;

detecting whether the delay time setting switch is switched off;

detecting whether the value for counted time is equal to or more than 0.5 sec. when a switch-off of the delay time setting switch is detected;

stopping the display operation of the display member when the value for counted time is equal to or more than 0.5 sec. when the counted time is within the delay time; and turning off the display operation of the display member when the value for counted time is less than 0.5 sec. after the delay time is lapsed.

9. The display control method for a vehicle as set forth in claim 6, further comprising the steps of:

detecting whether a delay time setting switch is switched on within the delay time;

detecting an operation state of a door switch when the switch-on of the delay tune setting switch is undetected;

stopping the display operation of the display member when an on to off operation of the door switch is detected within the delay time, on the other hand; and turning off the display operation of the display member when the on to off operation of the door switch is undetected after the delay time is lapsed.

* * * * *